US007184093B2

(12) United States Patent
Manning

(10) Patent No.: US 7,184,093 B2
(45) Date of Patent: Feb. 27, 2007

(54) VIDEO IMAGE FORMATTING TECHNIQUE

(75) Inventor: John Palmer Manning, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 824 days.

(21) Appl. No.: 10/151,599

(22) Filed: May 20, 2002

(65) Prior Publication Data

US 2003/0214603 A1 Nov. 20, 2003

(51) Int. Cl.
  *H04N 5/44* (2006.01)
  *H04N 5/46* (2006.01)
  *H04N 9/74* (2006.01)
  *H04N 7/01* (2006.01)
  *H04N 7/08* (2006.01)
  *H04N 11/20* (2006.01)
  *G09G 5/00* (2006.01)
  *G09G 5/02* (2006.01)
  *G09G 5/10* (2006.01)

(52) U.S. Cl. ............... 348/445; 348/452; 348/473; 348/556; 348/558; 348/561; 348/562; 348/580; 345/625; 345/628; 345/660; 345/698

(58) Field of Classification Search ........... 348/445, 348/452, 458, 473, 556, 558, 562, 580, 581–582, 348/699–701, 911, 913, 561; 345/603, 625, 345/628, 698, 660
See application file for complete search history.

(56) References Cited

U.S. PATENT DOCUMENTS

| 5,045,939 | A |   | 9/1991  | Okayama et al. |
|-----------|---|---|---------|----------------|
| 5,103,295 | A | * | 4/1992  | Uwabata et al. ............ 348/556 |
| 5,262,856 | A |   | 11/1993 | Lippman et al. ............ 358/136 |
| 5,400,077 | A | * | 3/1995  | Cookson et al. ............ 348/556 |
| 5,430,490 | A | * | 7/1995  | Rim ............................. 348/452 |
| 5,500,683 | A | * | 3/1996  | Yatomi et al. ............... 348/565 |
| 5,635,929 | A | * | 6/1997  | Rabowsky et al. ........... 341/50 |
| 5,973,740 | A | * | 10/1999 | Hrusecky ................ 375/240.15 |
| 5,999,220 | A | * | 12/1999 | Washino ..................... 348/441 |
| 6,278,736 | B1| * | 8/2001  | De Haan et al. ........ 375/240.16 |
| 6,400,852 | B1| * | 6/2002  | Miller et al. ................. 382/298 |
| 6,407,775 | B1| * | 6/2002  | Frink et al. .................. 348/443 |

(Continued)

FOREIGN PATENT DOCUMENTS

EP       0276985 B1     8/1994

OTHER PUBLICATIONS

Jim Taylor, *DVD Demystified*, pp. 79 through 98, McGraw-Hill 1998.

(Continued)

*Primary Examiner*—Brian P. Yenke
(74) *Attorney, Agent, or Firm*—Joseph J. Laks; Robert B. Levy

(57) ABSTRACT

The formatting of a video image frame (10) having a first aspect ratio to yield an image frame having a different aspect ratio is facilitated by establishing a pan and scan pixel coordinate (P) within the image that defines an image capture window for formatting purposes. A predictor (22) determines the pan and scan pixel coordinate by examining the image frame to determine the location therein of the most pertinent activity. The predictor (22) determines the location of the most pertinent activity by examining at least one of: video data, audio data, and other data such as closed captioning information.

4 Claims, 1 Drawing Sheet

U.S. PATENT DOCUMENTS

| | | | | |
|---|---|---|---|---|
| 6,437,787 | B1* | 8/2002 | Wu | 345/519 |
| 6,518,974 | B2* | 2/2003 | Taylor et al. | 345/582 |
| 6,694,311 | B1* | 2/2004 | Smith | 707/4 |
| 7,015,954 | B1* | 3/2006 | Foote et al. | 348/218.1 |
| 2002/0075403 | A1* | 6/2002 | Barone et al. | 348/461 |
| 2005/0099541 | A1* | 5/2005 | Bennett et al. | 348/556 |

OTHER PUBLICATIONS

Tony Donaldson, *Cinestream Product Review*, pp. 1 through 3, http://www.2-pop.com/article/pringerfriendly/0, 7226, 30214, 00 .html.

Mark Holtz, *DVD Special Features Listing*, last revised Jul. 30, 2000.

* cited by examiner

VIDEO IMAGE FORMATTING TECHNIQUE

TECHNICAL FIELD

This invention relates to a technique for formatting the dimensions of a video image for processing or for display on a display device with different dimensions.

BACKGROUND ART

Historically, the National Television Systems Committee (NTSC) in the United States adopted an aspect ratio of 4:3 for television images because the motion picture industry had earlier adopted the same aspect ratio for movies after determining that viewers preferred a rectangular image that had a greater width than height. Television standards organizations throughout the rest of the world have also adopted the 4:3 aspect ratio. With the advent of high definition television, such as the High Definition terrestrial broadcast system proposed by the Grand Alliance and described in the 1994 Proceedings of the National Association of Broadcasters, 48th Annual Broadcast Engineering Conference Proceedings, Mar. 20–24, 1994, content providers now offer high definition television programming having a 16:9 aspect ratio for display on wide screen television display devices.

While the market for high definition wide screen television display devices continues to grow, there remains a large embedded base of standard television display devices that can only display images having a 4:3 aspect ratio. To facilitate formatting of a wide screen video image having a 16:9 aspect ratio for display on a television display device that can only display images having a 4:3 aspect ratio, providers of wide screen content often encode a pixel coordinate within each individual frame to enable image format conversion by a "pan and scan" operation. Likewise, years from now when the embedded base of 16:9 aspect ratio display devices becomes large, video content from the 4:3 aspect ratio era will ultimately continue to be broadcast. Thus, a need will likewise exist for cropping a 4:3 aspect ratio image to fit within a video screen having a 16:9 aspect ratio.

The term "pan and scan" refers to a well-known technique for capturing a fixed-size window within a digital wide screen video image frame by effectively panning a row of picture elements (pixels) within the window and then scanning to the next row to commence a subsequent panning operation and so on. As described, the image capture window associated with the pan and scan format operation has a prescribed size. Thus, a single pixel coordinate, typically referred to as the "pan and scan pixel coordinate" will define such a window. In practice, the pan and scan pixel coordinate defines the center of the window. The location established for the pan and scan pixel coordinate affects what portion of the wide screen image remains after formatting. For example, establishing the location of the pan and scan pixel coordinate at the center of the wide screen image typically yields a formatted image that will not contain any activity occurring at the edges of image. To avoid such difficulties, some providers of video image content embed pan and scan pixel coordinates to facilitate formatting. However, because video image content is dynamic, such content providers must often embed a pan and scan pixel coordinate in each successive image frame to enable faithful formatting. Providing such pan and scan pixel coordinates has proven a very tedious process so only few content providers actually do so.

There, there is a need for a technique for automatically establishing a pan and scan pixel coordinate that overcomes the disadvantage of the prior art.

BRIEF SUMMARY OF THE INVENTION

Briefly, in accordance with present principles, a method is provided for establishing within an image frame a pixel coordinate (i.e., a "pan and scan" pixel coordinate) that defines an image capture window for formatting the image frame from a first aspect ratio (i.e., a first dimension) to a second aspect ratio (i.e., a second dimension). Pursuant to the method, an examination is made of the image frame to ascertain the location therein of the most pertinent activity. Several possible techniques exist for establishing the location of the most pertinent activity within the image frame. For example, in the case of an MPEG encoded video image frame, the coordinates associated with the macro block in the I, P and B pictures that exhibit the greatest change, or the location of the motion vectors exhibiting the greatest change can define the coordinates of the most pertinent activity within the image. Alternatively, the location within a video image frame of the pixel whose bit rate exhibits the greatest rate of change could also constitute the location of the most pertinent activity. Rather than rely on video data alone, audio data, corresponding to sound, sound effects or surround sound associated with a source within the image could also establish the location of the most pertinent activity. Alternatively, or in addition to using the video data and/or audio data, other data, such as the location of closed caption information within the image, can also establish the location of the most pertinent activity within the image. Indeed, the location of the most pertinent activity within the image can be given by a weighted sum of the video data, audio data and the other data. Having established the location of the most pertinent activity within the image, a pan and scan pixel coordinate is established such that its location coincides with the location of the most pertinent activity in the image.

In accordance with another aspect of the invention, there is provided a technique for formatting an image having a first aspect ratio to yield an image having a second aspect ratio. In accordance with the method, a pan and scan pixel coordinate is established, that is, the coordinate is located, in accordance with the location in the image of the most pertinent activity. In practice, for a television image, a combination of one or more of the video image data, audio data and/or other data is processed to yield the location of the most pertinent activity within the image. The pan and scan pixel coordinate is located to coincide with the location of the most pertinent activity in the image. The pan and scan pixel coordinate defines the location of an image capture window, which, when employed in connection with a pan and scan formatting operation, facilitates capture of an image that has the desired aspect ratio.

DETAILED DESCRIPTION

Figure 1:
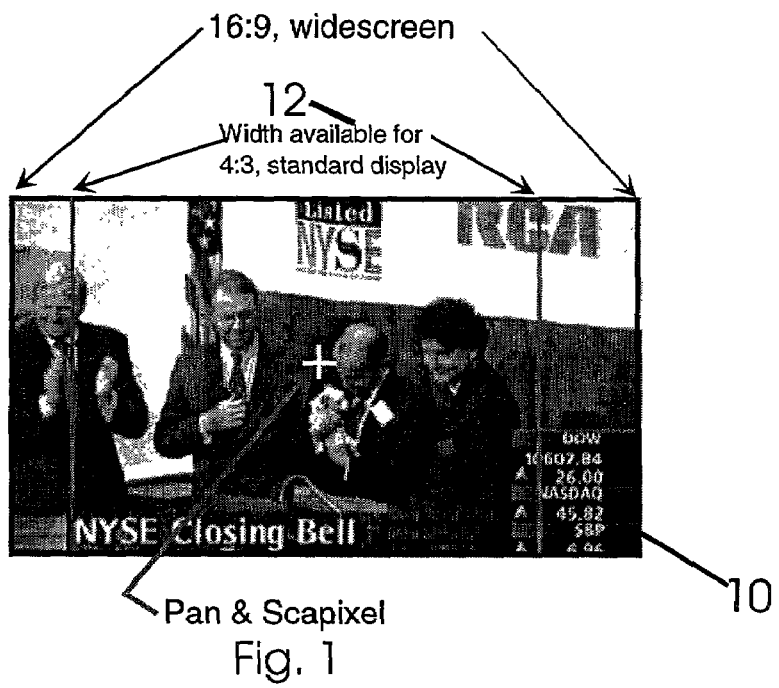
FIG. 1 depicts a frame of a wide screen video image.

FIG. 1 depicts a typical wide screen video image frame 10 having a 16:9 aspect ratio for display on a wide screen television display device (not shown). Superimposed on the image frame 10 is a second image frame 12 that corresponds in size to a "standard" frame image having a 4:3 aspect ratio for display on a standard television display device (not shown). Without formatting, the wide screen image frame 10 is simply too large for display on the standard television display device. Thus, the wide screen video image frame 10 must under go formatting to yield the standard size video image 12.

Among the various techniques that exist for formatting the wide screen video image frame 10 to yield standard size (4:3 aspect ratio) video image frame 12 is the "pan and scan" technique. The pan and scan technique enables formatting of a wide screen image frame (i.e., the image frame 10) by establishing an image capture window that is coextensive in size with the standard image frame 12. Each row of pixels in the image capture window is successively panned, and thereafter, a scanning operation occurs to jump to the next row of pixels for a subsequent panning operation. Because the image capture window associated with the pan and scan formatting operation has a fixed size, a single pixel coordinate, hereinafter "the pan and scan pixel coordinate" can define the window. In practice, the pan and scan pixel coordinate defines the center of the image capture window.

Heretofore, some providers of wide screen video image content have embedded pan and scan pixel coordinates to facilitate formatting by the pan and scan technique. Since the content within the wide screen video image 10 tends to be dynamic, the location of the pan and scan pixel coordinate must change to assure the resultant image obtained after formatting faithfully mirrors the content of interest in the wide screen image. In some instances, the pan and scan coordinate needs to change every frame, and for that reason, many content providers do not provide pan and scan pixel coordinates because of the time and effort involved in doing so.

Figure 2:
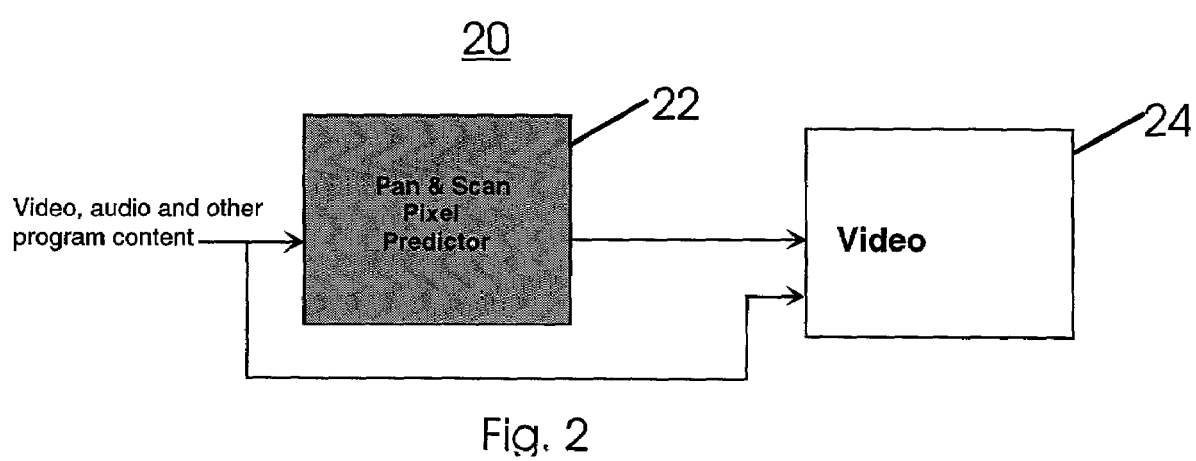
FIG. 2 depicts a block schematic diagram of an apparatus in accordance with present principles for establishing the location of a pan and scan pixel coordinate to facilitate formatting of the image of FIG. 1.

FIG. 2 shows an apparatus 20 in accordance with present principles for automatically establishing a pan and scan pixel coordinate to facilitate formatting an image, such as the wide screen image 10 of FIG. 1 by the pan and scan formatting operation. The apparatus 20 includes a predictor 22 that serves to determine the pan and scan pixel coordinate for the image in accordance with the location of the most pertinent activity within the image. The predictor 22 typically comprises a processor, a digital signal processor (DSP), or a fixed logic array, such as a Programmable Array Logic (PAL) or Field Programmable Gate Array (FPGA), or a combination of such elements, for processing one or more of video data, audio data, or other data, such as closed captioning data, to establish from such data, the location of the most pertinent activity within the image. From knowledge of the location of the most pertinent activity within the image, the pan and scan pixel coordinate is established to coincide with such location.

For example, in the case of MPEG encoded video data, the predictor 22 can establish the pan and scan pixel coordinate in accordance with the coordinates of the macro blocks in the I, P, and B pictures. Alternatively, in the case of MPEG encoded video image data, the predictor 22 can establish the pan and scan pixel coordinate in accordance with the location at which the motion vectors exhibit the greatest change. In accordance with yet another alternative approach, the predictor 22 can establish the pan and scan pixel coordinate in accordance with the location of the pixel within the image having the highest bit rate.

Rather than use video data to determine the pan and scan pixel coordinate, the predictor 22 can use audio data for this purpose. For example, the predictor 22 can employ digital and/or analog audio data to determine the location of the most pertinent activity within the image corresponding to the location of the sound (left or right) or the location of the sound effects having the greatest magnitude. The predictor 22 can also utilize the location of the surround sound (center, left, right or surround left/right) to determine the location of the most pertinent activity within the image and to establish the location of pan and scan pixel coordinate to coincide with such location.

The predictor 22 can also employ other data, such as the coordinates of close captioning information, to determine the location within the image of the most pertinent activity. Typically, closed captioning information appears within a video image in close proximity to the persons or persons whose speech appears as text in the closed caption. Thus, the coordinates of the close captioning information usually provide a good prediction of the location within the image of the most pertinent activity.

In practice, the predictor 22 typically employs a combination of video data, audio data and other data to determine the location of the most pertinent activity in the image and thus establish the pan and scan pixel coordinate. To that end, the predictor 22 can employ the following relationship to establish the pan and scan pixel coordinate P $$P = X1*F(V) + X2*F(A) + X3*F(D). \quad (1)$$

where,
 $X1$=weighting factor assigned to the video data (0<X1<1)
 $X2$=weighting factor assigned to the audio data (0<X2<1)
 $X3$=weighting factor assigned to the other data (0<X3<1)
 $F(V)$=coordinate predicted using video data
 $F(A)$=coordinate predicted using audio data
 $F(D)$=coordinate predicted using other data with $$X1 + X2 + X3 = 1. \quad (2)$$

The weighting factors X1, X2 and X3 can be determined empirically.

The output P of the predictor 22 (i.e., the pan and scan pixel coordinate) passes to a video processor 24 that can take form of an encoder, decoder or other device that has the capability of performing a pan and scan formatting operation on the video image. In other words, the processor 24 utilizes the pan and scan coordinate P established by the predictor 22 to determine the location of the pan and scan image capture window. Having established the location of the pan and scan image capture window, the processor 24 can then format the video image to the desired aspect ratio. In practice, the processor 24 can take the form of a computer programmed with one of several well-know video editing programs, such as "Media 100 CineStream" software available from Media 100, Marlboro, Mass., or MTI IntelliDeck® software available from Mathematical Technologies Inc. Providence, R.I.

In practice, the frames within the incoming video data received by the apparatus 20 have a 16:9 aspect ratio corresponding to wide screen video image data, and the processor 24 performs a pan and scan formatting operation to yield an image having a 4:3 aspect ratio. However, the frames within the incoming video data could have other aspect ratios, such as 5.5:3 or 7:3 as in the case with video images derived movies having standard and extra image width. Indeed, the frames within the incoming video image data could have a 4:3 aspect ratio and the processor 24 could perform a pan and scan operation in accordance with the pixel coordinate predicted by the predictor 22 to crop the image frames to change their aspect ratio to 16:9.

The foregoing describes a technique for establishing within a frame of a video image a pan and scan pixel coordinate location that defines an image capture window for formatting the image to change its aspect ratio.

While the present technique has been described in terms of post-production activities, i.e., the formatting of images frames that have already been originally captured, the technique has application in pre-production activities as well. Indeed, the predictor 20 could easily process "live" video image data to yield pan and scan pixel coordinates in advance of subsequent editing for alternate aspect ratios.

The invention claimed is:

1. A method for establishing a pan and scan pixel coordinate (P) that defines an image capture window useful for formatting an image having a first aspect ratio to yield an image having a second aspect ratio, comprising the steps of:

examining an incoming image frame by examining video, audio and image data associated with the image frame to ascertain a location therein of most pertinent activity; and establishing the pan and scan pixel coordinate in accordance with the location in the incoming image frame of the most pertinent activity in accordance with a predetermined combination of the video, audio and image data wherein the pan and scan pixel coordinate (P) is determined from the video, audio, and image data in accordance with the relationship:

$$P=X1*F(V)+X2*F(A)+X3*F(D)$$

where X1=weighting factor assigned to the video data (0<X1<1);
X2=weighting factor assigned to the audio data (0<X2<1);
X3=weighting factor assigned to the image data (0<X3<1);
F(V)=coordinate predicted using video data;
F(A)=coordinate predicted using audio data;
F(D)=coordinate predicted using image data;
with X1+X2+X3=1.

2. Apparatus for establishing a pan and scan pixel coordinate (P) that defines an image capture window useful for formatting an image from a first aspect ratio to a second aspect ratio, comprising:

means for examining the image frame to ascertain a location therein of most pertinent activity by examining video, audio and image data associated with the image frame;

means for establishing the pan and scan pixel coordinate in accordance with the location in the image of the most pertinent activity in accordance with a predetermined combination of the video, audio and image data;

wherein the determining means establishes the pan and scan pixel coordinate (P) in accordance with the relationship:

$$P=X1*F(V)+X2*F(A)+X3*F(D)$$

where
X1=weighting factor assigned to the video data (0<X1<1)
X2=weighing factor assigned to the audio data (0<X2<1)
X3=weighting factor assigned to the image data (0<X3<1)
F(V)=coordinate predicted using video data
F(A)=coordinate predicted using audio data
F(D)=coordinate predicted using image data
with X1+X2+X3=1.

3. A method for formatting an incoming image frame having a first aspect ratio to yield a formatted image frame having a second aspect ratio, comprising the step of:

establishing within the image frame a pan and scan pixel coordinate (P) that lies substantially coincident with a location in the image frame associated with most pertinent activity by examining video, audio and image data associated with the image frame, and panning and scanning the incoming image frame with an image capture window centered about the pan and scan pixel location, to format incoming image frame to yield the formatted image data frame in accordance with a predetermined combination of the video, audio and image data wherein the pan and scan pixel coordinate (P) is determined in accordance with the relationship:

$$P=X1*F(V)+X2*F(A)+X3*F(D)$$

where X1=weighting factor assigned to the video data (0<X1<1)
X2=weighting factor assigned to the audio data (0<X2<1)
X3=weighting factor assigned to the image data (0<X3<1)
F(V)=coordinate predicted using video data
F(A)=coordinate predicted using audio data
F(D)=coordinate predicted using image data
with X1+X2+X3=1.

4. Apparatus for formatting an incoming image frame having a first aspect ratio to yield a formatted image frame having a second aspect ratio, means for establishing within the image frame a pan and scan pixel coordinate (P) that lies substantially coincident with a location in the image frame associated with most pertinent activity by examining video, audio and image data associated with the image frame, and means for panning and scanning the incoming image frame with an image capture window centered about the pan and scan pixel coordinate to format incoming image frame to yield the formatted image frame in accordance with a predetermined combination of the video, audio arid image data wherein establishing means establishes the pan and scan pixel coordinate (P) in accordance with the relationship:

$$P=X1*F(V)+X2*F(A)+X3*F(D)$$

where
X1=weighting factor assigned to the video data (0<X1<1)
X2=weighting factor assigned to the audio data (0<X2<1)
X3=weighting factor assigned to the image data (0<X3<1)
F(V)=coordinate predicted using video data
F(A)=coordinate predicted using audio data
F(D)=coordinate predicted using image data
with X1+X2+X3=1.

* * * * *